United States Patent [19]

Liu

[11] Patent Number: 5,524,623
[45] Date of Patent: Jun. 11, 1996

[54] ADAPTIVE ARTIFACT SUPPRESSION FOR ULTRASOUND IMAGING

[75] Inventor: Dong-Chyuan Liu, Mercer Island, Wash.

[73] Assignee: Siemens Medical Systems, Inc., Iselin, N.J.

[21] Appl. No.: 497,343

[22] Filed: Jun. 30, 1995

[51] Int. Cl.⁶ ........................................................ A61B 8/00
[52] U.S. Cl. ............... 128/661.01; 128/901; 128/660.06; 367/901
[58] Field of Search ................... 128/660.01, 660.06, 128/660.07, 661.01, 661.08, 661.09, 901, 916; 364/413.25; 367/7, 135, 136, 901, 905

[56] References Cited

U.S. PATENT DOCUMENTS 5,228,009   7/1993   Forestieri et al. ............... 128/661.09
5,383,457   1/1995   Cohen ................................. 128/660.07

OTHER PUBLICATIONS

"Improved Ultrasonic Detection Using The Analytic Signal Magnitude," Gammell, Ultrasonics, Mar. 1981, pp. 73–76.

*Primary Examiner*—George Manuel

[57] ABSTRACT

A method for operating a digital computer to suppress reverberation artifacts in an ultrasound image. The image includes an ordered array of pixels, each the pixel corresponding to the intensity of the echo generated by a corresponding voxel in an ultrasound energy field. The ordered array has axial and lateral directions defined therein, the axial direction corresponding to voxels on the same radial line from a transducer used to generate the ultrasound energy field. The method starts by dividing the image into a plurality of segmentation blocks thereby generating an ordered array of segmentation blocks. The columns of the segmentation block array are chosen such that all segmentation blocks in the same column correspond to the same axial direction in the ultrasound image. In the preferred embodiment of the present invention, at least one segmentation block is classified as having a strong edge. The method of the present invention finds a first segmentation block that is classified as a strong edge, and then finds a second segmentation block which is not classified as a strong edge in the column containing the first segmentation block. A spatial frequency domain transformed block is then generated from a processing block containing the second segmentation block, and a modified transformed block generated from the spatial frequency domain transformed block by reducing the amplitude of selected peaks in the transformed block. Finally, a new second segmentation block is generated by computing the inverse spatial frequency transform of the modified transform block.

9 Claims, 2 Drawing Sheets

ADAPTIVE ARTIFACT SUPPRESSION FOR ULTRASOUND IMAGING

FIELD OF THE INVENTION

The present invention relates to ultrasound imaging, and more particularly, to a method for operating a computer to reduce reverberation artifacts in ultrasonic images.

BACKGROUND OF THE INVENTION

Medical ultrasound images are typically produced by generating an ultrasonic sound wave traveling in a known direction and observing the echoes created when the sound wave bounces off of boundaries between regions of differing density in the body. For any given direction, the image pixels are generated by plotting a dot whose brightness is proportional to the echo's amplitude at a coordinate whose location is a function of the time after a short pulse is send in the direction in question. The space between the transducer that generates the sound pulse and a strongly reflecting boundary forms a cavity that can reverberate. The resultant images have artifacts that are manifested by a pattern of parallel lines that are typically perpendicular to the direction of incidence of the sound wave.

It would be advantageous to provide an image processing system that can identify and remove these reverberation artifacts. Such a system needs to be able to distinguish the artifacts from the tissue boundary that is providing one wall of the reverberation chamber.

One prior art method for reducing reverberation artifacts utilizes a dual-frequency subtraction technique to suppress such artifacts. This method is based on the observation that echoes corresponding to reverberation artifacts are frequency-independent whereas the diffusely scattered echoes from small scattering centers such a speckle noise are frequency-dependent. Hence, the image obtained by the subtraction of two images at different frequencies has reduced reverberation echoes. Unfortunately, the echoes produced by real boundaries are also removed by this method. Since imaging such boundaries is an important part of ultrasound imaging, this method is less than perfect. Furthermore, the system requires a dual-frequency transducer to obtain the two images at the different frequencies which increase the cost of the system and reduces the frame rate, since two pictures must now be taken and processed for each frame displayed to the operator. Finally, the subtraction is performed in the amplitude domain; hence, care must be taken to match the gains of the two images which further complicates the method.

Broadly, it is the object of the present invention to provide an improved ultrasound imaging system.

It is a further object of the present invention to provide an ultrasound imaging system that can identify and reduce reverberation artifacts.

These and other objects of the present invention will become apparent to those skilled in the art from the following detailed description of the invention and the accompanying drawings.

SUMMARY OF THE INVENTION

The present invention is a method for operating a digital computer to suppress reverberation artifacts in an ultrasound image. The image includes an ordered array of pixels, each the pixel corresponding to the intensity of the echo generated by a corresponding voxel in an ultrasound energy field. The ordered array has axial and lateral directions defined therein, the axial direction corresponding to voxels on the same radial line from a transducer used to generate the ultrasound energy field. The method starts by dividing the image into a plurality of segmentation blocks thereby generating an ordered array of segmentation blocks. The columns of the segmentation block array are chosen such that all segmentation blocks in the same column correspond to the same axial direction in the ultrasound image. In the preferred embodiment of the present invention, at least one segmentation block is classified as having a strong edge. The method of the present invention finds a first segmentation block that is classified as a strong edge, and then finds a second segmentation block which is not classified as a strong edge in the column containing the first segmentation block. A spatial frequency domain transformed block is then generated from a processing block containing the second segmentation block, and a modified transformed block generated from the spatial frequency domain transformed block by reducing the amplitude of selected peaks in the transformed block. Finally, a new second segmentation block is generated by computing the inverse spatial frequency transform of the modified transform block. The removal process continues until the last segmentation block along the same axial direction has been processed.

DETAILED DESCRIPTION OF THE INVENTION

In an image processing system according to the present invention, an image is processed in two steps. First, the image is divided into blocks and those blocks that have reverberation artifacts identified. In the second step, the blocks so identified are transformed by applying a two-dimension fast Fourier Transform (FFT). The reverberation artifacts am periodic in nature; hence, these artifacts appear as peaks in the spatial frequency domain. The peaks corresponding to the reverberation artifacts are removed from the two-dimensional FFT spectrum and the block is reconstructed using an inverse two-dimensional FFT transform on the altered data.

While the removal of periodic artifacts in images is known to the prior art, in ultrasound applications, the artifacts must be removed while preserving other useful information such edges (especially the parallel edges) and vessel boundaries. Moreover, the speckle pattern in areas lacking artifacts should not be changed. These additional requirement make the selection of the blocks to be processed and the manner in which the peaks corresponding to reverberation artifacts selected critical. In principle, the user can identify the areas of the image that suffer from reverberation artifacts. In this case, the image filtering method taught below can be applied to the selected regions. However, the preferred embodiment of the present invention automatically selects the regions requiring filtering, as this avoids any biases that may be introduced by the observer. In addition, automatic identification reduces the operator training and time needed to complete the ultrasound imaging process.

Figure 1:
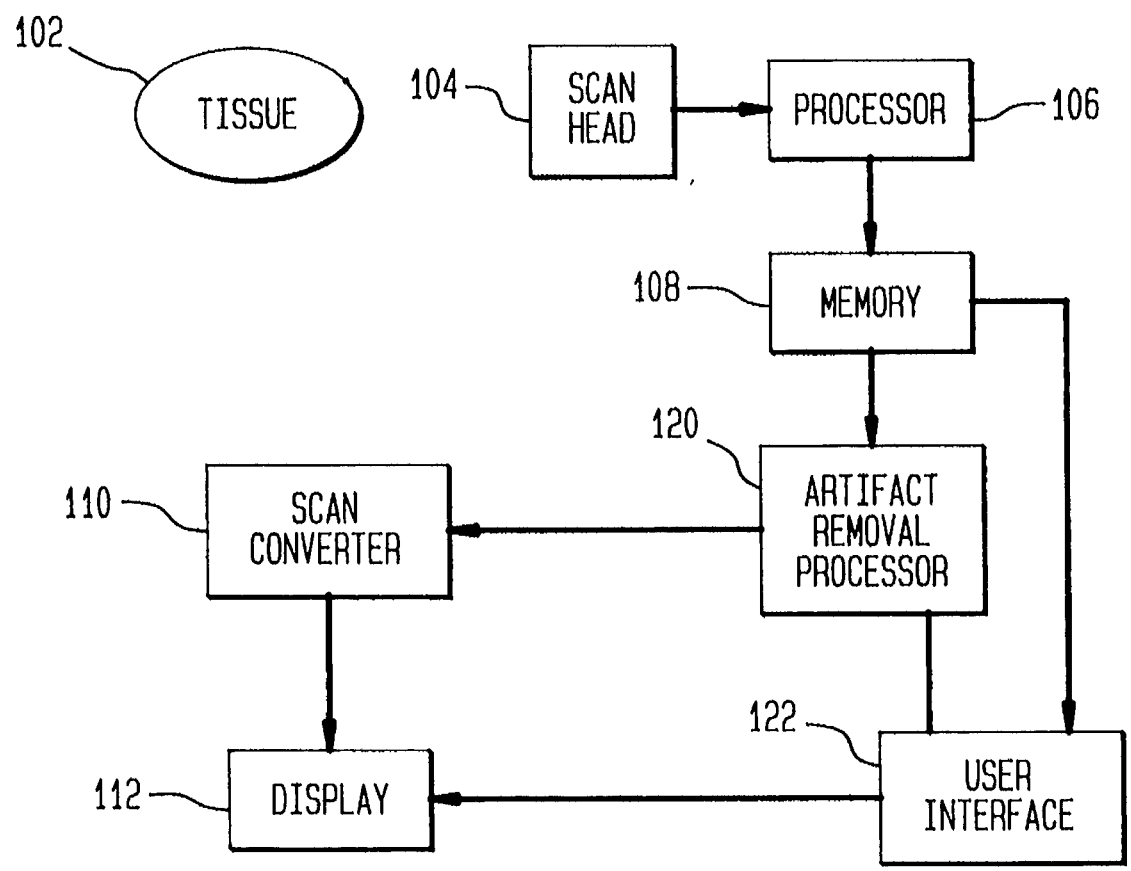
FIG. 1 is a block diagram of an ultrasound imaging system which utilizes an artifact removal system according to the present invention.

Refer now to FIG. 1 which is a block diagram of an ultrasound imaging system which utilizes an artifact removal system according to the present invention. The tissue 102 being scan is subjected to sound pulse generated by scan head 104 that includes a number of piezoelectric transducer elements. The recorded echoes are processed by a beam forming circuit 106 that generates echo data for each beam direction. Ultrasound images are typically taken in polar coordinates by scanning observing the echoes in the "r" direction for each of a number of scans at different angles, θ. The scan lines are typically saved in a rectangular array in memory 108 prior to resampling by scan converter 110 for display to the operator on display terminal 112. The preferred embodiment of the present invention 120 utilizes the scan data in this prior to resampling for display. The filtered data provided by the present invention is then used by the resampling system to provide the display to the user. In those embodiments of the present invention in which the user selects the areas to be processed by viewing the data stored in memory 108, a user interface 122 formats the data in memory 108 for display on display terminal 112. For the purposes of the following discussion the "r" measurements will assumed to be stored as the y-coordinates. The application of the artifact removal algorithm to the data r-θ data stored in the rectangular reduces the computational complexity of the reverberation artifact removal. The image may then be displayed in the usual coordinate system after the artifacts are removed by performing the conventional resampling of the data in this array.

The x-y array is then transformed by a two-dimensional FFT or similar transform to provide a spatial frequency domain representation of the image in the x-y array. Since the image is a real-valued array, it will be apparent to those skilled in the art that a fast cosine transform may also be used to perform this function. The reverberation artifacts are manifested as periodic noise that is strongest perpendicular to the r-direction of the scan. As noted above, the r-direction is defined to be the y-axis in the image memory array discussed above. Hence, the reverberation artifacts give rise to a series of peaks along one of the axes in the frequency domain. It should be noted, however, that since the original image consists of pixels that have non-negative values, there will always be a peak in the frequency domain corresponding to a spatial frequency of zero. The present invention removes the artifact by setting the peaks detected along the axis in question to zero, with the exception of the zero frequency peak. The correct image is then generated by applying the inverse transform to the frequency domain data.

The peaks in the frequency domain may be located by any suitable peak detection algorithm. It should be noted that the reverberation artifacts are periodic in nature. The distance of the peak to the origin in the frequency domain corresponds to the spatial frequency of the periodic artifact. The direction of the line from the peak to the origin in the frequency domain corresponds to the orientation of the artifact. Alternatively, a simple peak detection algorithm which searches for regions of the spectrum that are above a fixed threshold or which exhibit local maxima may be used.

To support the real-time applications, an automatic artifact suppression algorithm is preferred over an algorithm requiring the user to select the regions having the reverberation artifacts. Any automatic algorithm must have the ability to differentiate a region having a reverberation pattern from a region having edges, especially parallel edges, or a region filled with just speckles. In this regard, the algorithm cannot depend solely on the amplitude of the peaks in the frequency domain since real parallel edges such as those generated by the boundaries of blood vessels always give strong peaks in the frequency domain.

In one embodiment of the present invention the blocks chosen for filtering to remove reverberation artifacts are those in which a substantial fraction of the peaks in the frequency domain representation of the block correspond to the dominant direction. As noted above, the dominant direction corresponds to patterns that are perpendicular to the scanning beam direction. If the transformation of the image from the polar scan coordinates to the x-y array described above is used, then the dominant direction will be parallel to the y-axis. To guard against deleting strong edges, an upper bound is placed on the fraction of peaks that are in the dominant direction, since a strong edge, or parallel edges, perpendicular to the ultrasound beam will always generate a large peak in the dominant direction. The lower bound prevents distortions from speckle patterns.

In the preferred embodiment of the present invention, a somewhat more complicated block selection is used which makes use of the observation that reverberation artifacts are generated after strong specular echoes and perpendicular to the beam direction. In this embodiment of the present invention, the blocks selected for artifact removal are those that follow a block having a strong edge and do not have strong edges within the block.

The existence of a strong edge can be detected by examining the second-order statistics of the block in question along the axial direction. If sufficient computational power is available, the second-order statistics in terms of the co-occurence matrix may be used instead of the approximation discussed below. Hence, the statistical measures utilized will be discussed both in terms of the co-occurence matrix and the sum and difference histograms utilized in the approximation used in the preferred embodiment of the present invention. The spatial gray-level co-occurrence matrix for a direction defined by the relative positions $(k,j)$ and $(k+\Delta x, j+\Delta y)$ in an array $I_{k,j}$ is given by $$C(i,j,\Delta x,\Delta y) = \frac{1}{N} \; Card\{(k,l)|I_{k,l}=i, I_{k+\Delta x, l+\Delta y}=j\} \qquad (1)$$

$$N = \sum_{i=0}^{N_r} \sum_{j=0}^{N_r} C(i,j,\Delta x,\Delta y)$$

where Card refers to the number of pixels for which the intensity of the pixel at (k,l) has intensity i and the pixel displaced from that pixel by $(\Delta x, \Delta y)$ has intensity j. Here, $N_r$ is the number of gray levels with which the image is quantized.

Similar information can be obtained at significantly less computational cost by using sum and difference histograms. It can be shown that the sum and difference of two random variables define the principal axes of the second order probability function of a stationary process. Further, for two independent and uncorrelated random variables, the joint probability function can be computed from the product of the probability function of the sum and difference variables. This observation allows the usual co-occurrence matrices to be approximated by their associated sum and difference histograms which can be estimated directly from the image. The error in this approximation is related to the degree to which the hypothesis of independence is satisfied. The sum and difference histograms, denoted respectively by $P_s$ and $P_d$, are defined as follows:

$$P_s(i,\Delta x,\Delta y) = \frac{1}{N} \, Card\{(k,l)|I_{k,l} + I_{k+\Delta x, l+\Delta y} = i\} \quad (2)$$

$$P_d(i,\Delta x,\Delta y) = \frac{1}{N} \, Card\{(k,l)|I_{k,l} - I_{k+\Delta x, l+\Delta y} = i\}$$

$$N = \sum_i P_s(i,\Delta x,\Delta y) = \sum_i P_d(i,\Delta x,\Delta y)$$

The features used to characterize blocks of the image may be written in terms of the co-occurrence or sum and difference histogram approximations. These features will be referred to as "texture parameters" in the following discussion. The texture parameters of interest in the preferred embodiment of the present invention are summarized in Table I below.

TABLE I

| | Computation of Texture Parameters | |
|---|---|---|
| Texture Parameter | Co-occurrence matrix computation | Sum and difference histogram computation |
| mean | $\sum_i \sum_j i C(i,j) = \mu$ | $\frac{1}{2} \sum_i i P_s(i) = \mu$ |
| variance | $\sum_i \sum_j (i-\mu)^2 C(i,j)$ | $\frac{1}{2} \left( \sum_i (1-2\mu)^2 P_s(i) + \sum_j j^2 P_d(j) \right)$ |
| correlation | $\sum_i \sum_j (i-\mu)(j-\mu) C(i,j)$ | $\frac{1}{2} \left( \sum_i (1-2\mu)^2 P_s(i) - \sum_j j^2 P_d(j) \right)$ |

The preferred embodiment of the present invention uses these statistical measures in the lateral direction, i.e., at right angles to the ultrasound beam, because reverberation patterns are most strongly generated when the sound pulse strikes a boundary at right angles to the boundary.

The classification is carried out by first dividing the image into processing blocks, each with the dimension of m×m pixels. In each block, the texture parameters described above are computed for the lateral direction. It should be noted that the texture parameters described above are depend on the displacement direction specified by (Δx, Δy). Hence, the "mean" corresponding to the direction dependent co-occurrence matrix is not the same as the mean from the local amplitude distribution as normally defined. The values obtained for the texture parameters are quantized such that decisions are based on ranges of values, referred to as Small, Medium, and Large in the following discussion. The quantization is performed separately for the three texture parameters and each column of processing blocks. That is, the range of values for each texture parameter is computed for all of the processing blocks in a given column. The values in that column are then quantized into the three values for that texture parameter in the column. The process is repeated for each column. This procedure has the advantage of providing a self-calibration of the texture parameters. If the observed range of values for any texture parameter in any column is too small, the division of the small range into Small and Very Small may be omitted, i.e., only the Small level is used. Similarly, the classification of Large can be omitted if the range is too small. This situation arises when the blocks in the column all contain speckles or other uninteresting features.

A block is defined to be a "strong edge" if the mean, variance and correlation are Large. A block is defined as an insignificant area if the mean, variance and correlation are Small. Only those blocks that are neither strong edges or insignificant areas are processed in the preferred embodiment of the present invention. In addition, only blocks located along the axial direction after a block having a strong edge are processed.

The processing block size for the FFT is larger than that for texture analysis in the preferred embodiment of the present invention. The preferred block size for texture parameter computation is typically 16×16 pixels. These blocks will be referred to as "segmentation blocks" in the following discussion. To obtain sufficient information in the frequency domain, a block of typically 32×32 is required. These blocks will be referred to as "processing blocks" in the following discussion. Hence, one processing block contains 4 segmentation blocks. To accommodate this difference, the method of the present invention selects blocks based on the texture and removes the artifacts using the larger processing block containing the segmentation block in question; however, the pixels are only updated in the segmentation blocks included in the processing block that were not strong edges or insignificant areas as defined above.

Figure 2:
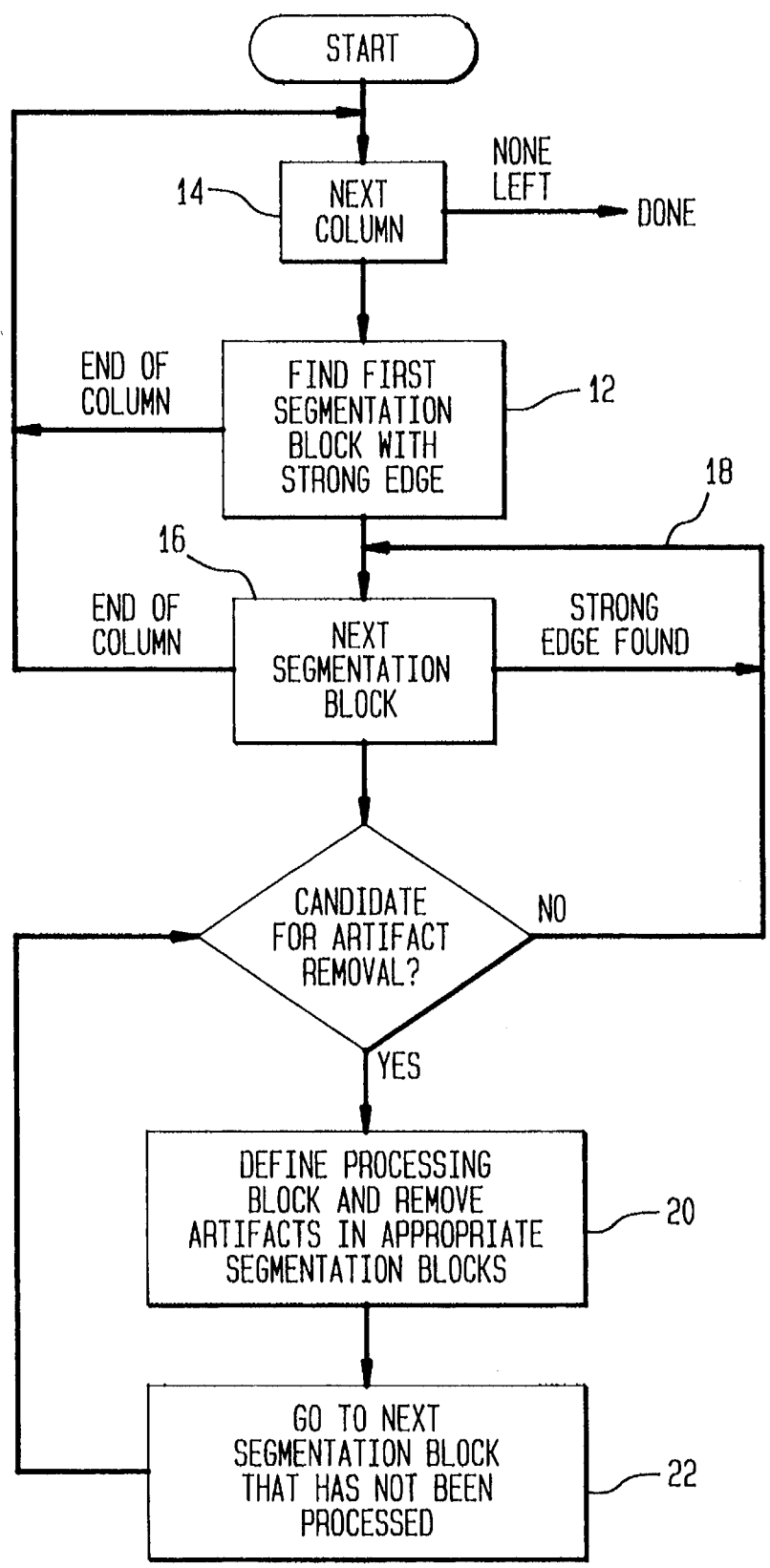
FIG. 2 is a flow chart of the preferred embodiment of an adaptive artifact suppression system according to the present invention.

Refer now to FIG. 2 which is a flow chart of the preferred embodiment of an adaptive artifact suppression method according to the present invention. For each column of segmentation blocks, the column is searched to find the first block having an edge or the end of the column, which ever comes first as shown at 12. If the end of the column is encountered, a new column is started as shown at 14. If a strong edge segmentation block is found, the program proceeds to examine the block after the one containing the strong edge as shown at 16, provided the end of the column is not encountered. If this block is also a strong edge, the program proceeds to the next block as shown at 18. If the block is a candidate for artifact suppression, i.e., not a strong edge or insignificant, and has not already been processed, the artifact removal algorithm is applied to the processing block containing this block as shown at 20. In the preferred embodiment of the present invention, the processing block is defined so that it contains the segmentation block in question, the block after the segmentation block in the axial direction, and the blocks in the next column that have not yet been processed. As noted above, the segmentation blocks contained in the processing block that are not strong edges or insignificant areas are updated as part of the artifact removal. The algorithm then proceeds to the next segmentation block that has not been processed in the column being processed as shown at 22.

While the preferred embodiment of the present invention is implemented on a conventional micro-processor of the type that is normally included in clinical ultrasound systems, it will be apparent to those skilled in the art that the method of the present invention can be practiced on any general purpose computing system. In addition, it will be apparent to those skilled in the art that special purpose computing hardware for accelerating the texture parameter and spatial to frequency domain computations may also be included in the computer system.

Various modifications to the present invention will become apparent to those skilled in the art from the foregoing description and accompanying drawings. Accordingly, the present invention is to be limited solely by the scope of the following claims.

What is claimed is:

1. A method for suppressing reverberation artifacts in an ultrasound image comprising an ordered array of pixels, each said pixel corresponding to the intensity of the echo generated by a corresponding voxel in an ultrasound energy field, said ordered array having an axial and lateral direction defined therein, said axial direction corresponding to voxels on the same radial line from a transducer used to generate said ultrasound energy field, said method comprising the steps of:

dividing said image into a plurality of segmentation blocks thereby generating an ordered array of segmentation blocks having columns such that all segmentation blocks in the same column correspond to the same axial direction in said ultrasound image;

classifying at least one of said segmentation blocks as having a strong edge;

finding a first segmentation block that is classified as a strong edge;

finding a second segmentation block in said column containing said first segmentation block, said second segmentation block not being classified as a strong edge;

generating a spatial frequency domain transformed block from a processing block containing said second segmentation block;

generating a modified transformed block from said spatial frequency domain transformed block by reducing the amplitude of selected peaks in said transformed block; and generating a new second segmentation block by computing the inverse spatial frequency transform of said modified transform block.

2. The method of claim 1 wherein at least one of said segmentation blocks is classified as an insignificant area and wherein said second segmentation block is also not classified as being an insignificant area.

3. The method of claim 1 wherein said step of classifying comprising computing the mean, variance, and correlation in said axial direction using a co-occurrence matrix for the pixels of said segmentation block.

4. The method of claim 1 wherein said step of classifying comprising computing the mean, variance, and correlation in said direction using sum and difference histograms for the pixels of said selected block.

5. The method of claim 4 wherein said mean, variance, and correlation are quantized based on the range of said mean, variance, and correlation in said segmentation blocks in said column containing said first segmentation block.

6. The method of claim 1 wherein said processing block is larger than said second segmentation block.

7. The method of claim 1 wherein said step of generating said spatial frequency transformed block comprises computing a Fourier transform of said processing block.

8. The method of claim 1 wherein said step of generating said spatial frequency transformed block comprises computing a cosine transform of said processing block.

9. The method of claim 1 wherein said selected peaks are selected on the basis of the energy in said peaks in dominant direction to the total energy in said spatial frequency domain.

* * * * *